US008494457B2

(12) United States Patent
Zheng

(10) Patent No.: US 8,494,457 B2
(45) Date of Patent: Jul. 23, 2013

(54) SYSTEMS, METHODS AND TRANSCEIVERS FOR WIRELESS COMMUNICATIONS OVER DISCONTIGUOUS SPECTRUM SEGMENTS

(75) Inventor: Dunmin Zheng, Vienna, VA (US)

(73) Assignee: ATC Technologies, Inc., Reston, VA (US)

( * ) Notice: Subject to any disclaimer, the term of this patent is extended or adjusted under 35 U.S.C. 154(b) by 0 days.

(21) Appl. No.: 12/765,946

(22) Filed: Apr. 23, 2010

(65) Prior Publication Data

US 2010/0203828 A1    Aug. 12, 2010

Related U.S. Application Data

(62) Division of application No. 11/679,598, filed on Feb. 27, 2007.

(60) Provisional application No. 60/777,602, filed on Feb. 28, 2006.

(51) Int. Cl.
*H04B 1/40* (2006.01)

(52) U.S. Cl.
USPC .......................................................... 455/77

(58) Field of Classification Search
USPC ..................................... 455/77; 370/335, 344
See application file for complete search history.

(56) References Cited

U.S. PATENT DOCUMENTS

| | | | |
|---|---|---|---|
| 7,483,672 B2 | 1/2009 | Hart et al. | |
| 7,613,242 B2 | 11/2009 | Bykovnikov | |
| 7,616,704 B2 * | 11/2009 | Li et al. | 375/299 |
| 7,668,253 B2 | 2/2010 | Hwang et al. | |
| 7,738,571 B2 | 6/2010 | Costa et al. | |
| 2004/0090933 A1 | 5/2004 | McFarland et al. | |
| 2005/0013238 A1 * | 1/2005 | Hansen | 370/203 |
| 2005/0207385 A1 | 9/2005 | Gorokhov et al. | |

(Continued)

FOREIGN PATENT DOCUMENTS

| | | |
|---|---|---|
| EP | 0 762 669 A2 | 3/1997 |
| EP | 0 762 669 A3 | 3/1997 |

(Continued)

OTHER PUBLICATIONS

Alasti et al. "A Discrete Multi Carrier Multiple Access Technique for Wireless Communications" *Vehicular Technology Conference 1998. VTC 98. 48th IEEE* Ottawa, Ont. Canada 18-21 (1998); *IEEE* 21533-1537 (1998).

(Continued)

*Primary Examiner* — Andrew Wendell
*Assistant Examiner* — David Bilodeau
(74) *Attorney, Agent, or Firm* — Myers Bigel Sibley & Sajovec

(57) ABSTRACT

Methods of transmitting a plurality of communications signals over a plurality of discontiguous bandwidth segments in a frequency band include defining a plurality ($N_{FFT}$) of orthogonal subcarriers across the frequency band, defining a plurality (N) of available physical subcarriers from among the orthogonal subcarriers. The available physical subcarriers are distributed among the plurality of discontiguous bandwidth segments. The methods further include multiplexing the plurality of communications signals onto the plurality of available physical subcarriers. Multiplexing the plurality of communications signals onto the plurality of available physical subcarriers may include assigning the communications signals to respective ones of a plurality (N) of logical subcarriers, and mapping the plurality of logical subcarriers to corresponding ones of the plurality of available physical subcarriers. Related transmitters, receivers and communications systems are also disclosed.

31 Claims, 7 Drawing Sheets

U.S. PATENT DOCUMENTS

| | | | |
|---|---|---|---|
| 2005/0215251 A1 | 9/2005 | Krishnan et al. | |
| 2005/0220002 A1* | 10/2005 | Li et al. | 370/208 |
| 2007/0004465 A1* | 1/2007 | Papasakellariou et al. | 455/571 |
| 2007/0041311 A1* | 2/2007 | Baum et al. | 370/208 |
| 2007/0202816 A1* | 8/2007 | Zheng | 455/91 |
| 2007/0298728 A1* | 12/2007 | Imamura et al. | 455/77 |

FOREIGN PATENT DOCUMENTS

| | | |
|---|---|---|
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 02/33925 A2 | 4/2002 |
| WO | WO 03/026143 A2 | 3/2003 |
| WO | WO 2005/104589 A1 | 11/2005 |

OTHER PUBLICATIONS

International Search Report and Written Opinion for PCT/US2007/004956; mailed Jul. 20, 2007.

Poston et al. "Discontiguous OFDM Considerations for Dynamic Spectrum Access in Idle TV Channels" *New Frontiers in Dynamic Spectrum Access Networks* 2005); *First IEEE International Symposium on Baltimore, MD* (2005); *IEEE* 607-610 (2005).

Wong et al., A Real Time Subcarrier Allocation Scheme for Multiple Access Downlink OFDM Transmission, 1999, IEEE.

* cited by examiner

SYSTEMS, METHODS AND TRANSCEIVERS FOR WIRELESS COMMUNICATIONS OVER DISCONTIGUOUS SPECTRUM SEGMENTS

CROSS REFERENCE TO RELATED APPLICATION

This application is a divisional of U.S. application Ser. No. 11/679,598 filed Feb. 27, 2007 which application claims the benefit of and priority to U.S. Provisional Patent Application No. 60/777,602, filed Feb. 28, 2006, the disclosures of which are hereby incorporated herein by reference as if set forth in their entireties.

FIELD OF THE INVENTION

This invention relates to wireless communications systems and methods, and more particularly to terrestrial and/or satellite wireless communications systems and methods.

BACKGROUND

Wireless communications systems and methods are widely used for transmitting and/or receiving information between at least two entities using a modulated carrier frequency that occupies a substantially contiguous band of frequencies over a predetermined bandwidth. For example, an Orthogonal Frequency Division Multiplexed/Multiple Access (OFDM/OFDMA) communications system and method may use a number of modulated sub-carriers which are contiguously configured in frequency so as to occupy an aggregate (overall) carrier bandwidth of, for example, 1.25 MHz. Terrestrial wireless communications systems and methods may be based on cellular/PCS and/or other techniques.

Satellite communications systems and methods are based on wireless communications technologies and employ at least one space-based component, such as one or more satellites, that is/are configured to communicate with a plurality of satellite radioterminals. A satellite radioterminal communications system or method may utilize a single antenna beam covering an entire area served by the system. Alternatively, in cellular satellite radioterminal communications systems and methods, multiple beams are provided, each of which can serve distinct geographical areas in the overall service region, to collectively serve an overall satellite footprint. Thus, a cellular architecture similar to that used in conventional terrestrial cellular/PCS radioterminal systems and methods can be implemented in cellular satellite-based systems and methods. The satellite typically communicates with radioterminals over a bidirectional communications pathway, with radioterminal communication signals being communicated from the satellite to the radioterminal over a downlink or forward link, and from the radioterminal to the satellite over an uplink or return link.

As used herein, the term "radioterminal" includes cellular and/or satellite radioterminals; Personal Communications System (PCS) terminals that may combine a radioterminal with data processing, facsimile and/or data communications capabilities; Personal Digital Assistants (PDA) that can include a radio frequency transceiver and a pager, Internet/Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A "radioterminal" also may be referred to herein as a "subscriber station," "radiotelephone," "terminal", "wireless terminal" or "wireless user device".

Terrestrial networks can enhance cellular satellite radioterminal system availability, efficiency and/or economic viability by terrestrially reusing at least some of the frequency bands that are allocated to cellular satellite radioterminal systems. In particular, it is known that it may be difficult for cellular satellite radioterminal systems to reliably serve densely populated areas, because the satellite signal may be blocked by high-rise structures and/or may not penetrate into buildings. As a result, the satellite spectrum may be underutilized or unutilized in such areas. The terrestrial reuse of at least some of the satellite system frequencies can reduce or eliminate this potential problem.

Moreover, the capacity of a hybrid system, comprising terrestrial and satellite-based connectivity and configured to terrestrially reuse at least some of the satellite-band frequencies, may be higher than a corresponding satellite-only system since terrestrial frequency reuse may be much denser than that of the satellite-only system. In fact, capacity may be enhanced where it may be mostly needed, i.e., in densely populated urban/industrial/commercial areas where the connectivity/signal(s) of a satellite-only system may be unreliable. As a result, a hybrid (satellite/terrestrial cellular) system that is configured to reuse terrestrially at least some of the frequencies of the satellite band may become more economically viable, as it may be able to serve more effectively and reliably a larger subscriber base.

U.S. Pat. No. 6,684,057, to Karabinis, and entitled Systems and Methods for Terrestrial Reuse of Cellular Satellite Frequency Spectrum, the disclosure of which is hereby incorporated herein by reference in its entirety as if set forth fully herein, describes that a satellite frequency can be reused terrestrially by an ancillary terrestrial network even within the same satellite cell, using interference cancellation techniques. In particular, a system according to some embodiments of U.S. Pat. No. 6,684,057 includes a space-based component that is configured to receive wireless communications from a first radiotelephone in a satellite footprint over a satellite radiotelephone frequency band, and an ancillary terrestrial network that is configured to receive wireless communications from a second radiotelephone in the satellite footprint over the satellite radiotelephone frequency band. The space-based component also receives the wireless communications from the second radiotelephone in the satellite footprint over the satellite radiotelephone frequency band as interference, along with the wireless communications that are received from the first radiotelephone in the satellite footprint over the satellite radiotelephone frequency band. An interference reducer is responsive to the space-based component and to the ancillary terrestrial network that is configured to reduce the interference from the wireless communications that are received by the space-based component from the first radiotelephone in the satellite footprint over the satellite radiotelephone frequency band, using the wireless communications that are received by the ancillary terrestrial network from the second radiotelephone in the satellite footprint over the satellite radiotelephone frequency band.

Satellite radioterminal communications systems and methods that may employ terrestrial reuse of satellite frequencies are also described in U.S. Pat. No. 6,785,543 to Karabinis, entitled Filters For Combined Radiotelephone/GPS Terminals, and Published U.S. Patent Application Nos. U.S. 2003/

0054761 to Karabinis, entitled Spatial Guardbands for Terrestrial Reuse of Satellite Frequencies; U.S. 2003/0054814 to Karabinis et al., entitled Systems and Methods for Monitoring Terrestrially Reused Satellite Frequencies to Reduce Potential Interference; U.S. 2003/0054762 to Karabinis, entitled Multi-Band/Multi-Mode Satellite Radiotelephone Communications Systems and Methods; U.S. 2003/0153267 to Karabinis, entitled Wireless Communications Systems and Methods Using Satellite-Linked Remote Terminal Interface Subsystems; U.S. 2003/0224785 to Karabinis, entitled Systems and Methods for Reducing Satellite Feeder Link Bandwidth/Carriers In Cellular Satellite Systems; U.S. 2002/0041575 to Karabinis et al., entitled Coordinated Satellite-Terrestrial Frequency Reuse; U.S. 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; U.S. 2003/0068978 to Karabinis et al., entitled Space-Based Network Architectures for Satellite Radiotelephone Systems; U.S. 2003/0153308 to Karabinis, entitled Staggered Sectorization for Terrestrial Reuse of Satellite Frequencies; and U.S. 2003/0054815 to Karabinis, entitled Methods and Systems for Modifying Satellite Antenna Cell Patterns In Response to Terrestrial Reuse of Satellite Frequencies, U.S. 2004/0121727 to Karabinis, entitled Systems and Methods For Terrestrial Reuse of Cellular Satellite Frequency Spectrum In A Time-Division Duplex Mode, U.S. 2004/0192293 to Karabinis, entitled Aggregate Radiated Power Control For Multi-Band/Multi-Mode Satellite Radiotelephone Communications Systems And Methods, U.S. 2004/0142660 to Churan, entitled Network-Assisted Global Positioning Systems, Methods And Terminals Including Doppler Shift And Code Phase Estimates, and U.S. 2004/0192395 to Karabinis, entitled Co-Channel Wireless Communication Methods and Systems Using Nonsymmetrical Alphabets, all of which are assigned to the assignee of the present invention, the disclosures of all of which are hereby incorporated herein by reference in their entirety as if set forth fully herein.

Satellite communications systems and methods may be used for voice and/or data. Moreover, satellite communications systems and methods are increasingly being used with broadband information, such as multimedia information. Unfortunately, it may be difficult to send and receive broadband information over conventional satellite communications systems and methods. In particular, communications frequencies allocated to satellite communications may be highly fragmented, and may not include contiguous segments having a wide enough bandwidth to individually support broadband communications. Moreover, as the demand for wider bandwidth communications systems and methods increases, there may be increased need to utilize non-contiguous bandwidth segments for communication of a broadband communications signal for both satellite and terrestrial based communications.

Communications systems and methods for transmitting broadband signals over discontiguous frequency segments are disclosed in commonly assigned and copending U.S. patent application Ser. No. 11/006,318, filed Dec. 7, 2004 and entitled "Broadband Wireless Communications Systems and Methods Using Multiple Non-Contiguous Frequency Bands/Segments." As demand for broadband communications using discontiguous frequency bands increases, improved communications systems and/or methods may be desired.

SUMMARY

Some embodiments of the invention provide methods of transmitting a plurality of communications signals over a plurality of discontiguous bandwidth segments in a frequency band. The methods include defining a plurality ($N_{FFT}$) of orthogonal subcarriers across the frequency band, and defining a plurality (N) of available physical subcarriers from among the orthogonal subcarriers, where $N<N_{FFT}$. The available physical subcarriers are distributed among at least some of the plurality of discontiguous bandwidth segments. The methods further include multiplexing the plurality of communications signals onto the plurality of available physical subcarriers.

Multiplexing the plurality of communications signals onto the plurality of available physical subcarriers may include assigning the communications signals to respective ones of a plurality (N) of logical subcarriers, and mapping the plurality of logical subcarriers to corresponding ones of the plurality of available physical subcarriers.

Multiplexing the communications signals onto the plurality of available physical subcarriers may further include assigning at least one pilot signal to at least one of the plurality of logical subcarriers, and modulating each of the available physical subcarriers with data from a corresponding logical subcarrier.

The methods may further include defining a plurality ($N_{FFT}-N$) of unavailable physical subcarriers within the frequency band, and setting an input data signal corresponding to each of the plurality of unavailable physical subcarriers to zero. The communications signals and the at least one pilot signal may include N information signals corresponding to the available physical subcarriers, and modulating each of the available physical subcarriers with data from a corresponding logical subcarrier may include performing an $N_{FFT}$-point inverse fourier transform of the N information signals corresponding to the available physical subcarriers and the $N_{FFT}-N$ input data signals corresponding to each of the plurality of unavailable physical subcarriers.

The methods may further include converting an output of the $N_{FFT}$-point inverse fourier transform to a serial data stream, and transmitting the serial data stream.

The methods may further include defining a plurality of clusters in the discontiguous bandwidth segments, each of the clusters including a plurality contiguous subcarriers, defining an adaptive modulation and coding (AMC) subchannel including a plurality of contiguous clusters extending over a plurality of contiguous symbols, allocating a first plurality of subcarriers within the AMC subchannel as pilot subcarriers, such that the pilot subcarriers are distributed uniformly across the AMC subchannel, and allocating a second plurality of subcarriers within the AMC subchannel as data subcarriers.

Defining the AMC subchannel may include defining a subchannel including two clusters over three symbols or one cluster over six symbols. The pilot subcarriers for an AMC subchannel may be allocated at locations determined by the indices of logical subcarriers, and the pilot subcarriers in an AMC channel may be offset by two subcarriers in adjacent symbols.

The pilot subcarriers for an AMC channel including nine subcarriers per cluster may be determined according to the equation:

$$\text{pilot\_subs}(n, k) = 9n + 3m + 1$$

$$\text{for } n = 0, 1, \ldots, \left\lceil \frac{N}{9} \right\rceil,$$

where n is an index number of a pilot subcarrier in a symbol, k is an index of the symbol, m is given by k mod 3, and $\lceil X \rceil$ denotes the largest integer not greater than X.

The methods may further include assigning a plurality of data symbols to data subcarriers in the AMC subchannel according to a scrambling sequence, such as a scrambling sequence defined by a Galois field and an offset. The scrambling sequence may be unique to a particular cell and/or sector of a wireless communications system.

Multiplexing the plurality of communications signals onto the plurality of available physical subcarriers may include spreading the plurality of communications signals using a plurality of corresponding spreading codes, combining the plurality of spread communications signals to form a combined communications signal, and converting the combined communications signal to parallel communications signals. Combining the plurality of communications signals to form a combined communications signal may include combining the plurality of communications signals with a pilot signal.

Multiplexing the plurality of communications signals onto the plurality of available physical subcarriers may include assigning the parallel communications signals to respective ones of a plurality (N) of logical subcarriers, and mapping the plurality of logical subcarriers to corresponding ones of the plurality of available physical subcarriers.

Multiplexing the communications signals onto the plurality of available physical subcarriers may include assigning at least one pilot signal to at least one of the plurality of logical subcarriers, and modulating each of the available physical subcarriers with data from a corresponding logical subcarrier.

Some embodiments of the invention provide methods of transmitting a plurality of communications signals over a plurality of discontiguous bandwidth segments in a frequency band, including defining a plurality ($N_{FFT}$) of orthogonal subcarriers across the frequency band, and defining a plurality (N) of available physical subcarriers from among the orthogonal subcarriers, where the available physical subcarriers are distributed among the plurality of discontiguous bandwidth segments.

The methods further include receiving M data symbols for each of K users, and spreading the data symbols of each user by an L-bit spreading code associated with the user to provide M spread data symbols for each of the K users. The mth data symbols associated with each of the K users are combined to provide M composite data signals, and the M composite data signals are converted to parallel input signals having a length L. The M parallel input signals are interleaved to provide Q interleaved input signals having a length N, and the Q interleaved input signals are assigned to the N available physical subcarriers. The Q interleaved input signals are transmitted on the N available physical subcarriers.

Transmitting the Q interleaved input signals on the N available physical subcarriers may include assigning zeros to $N_{FFT}$-N unavailable physical subcarriers to provide $N_{FFT}$ input signals and performing an $N_{FFT}$ point inverse fourier transform on the $N_{FFT}$ input signals.

A transmitter for a wireless communications system according to some embodiments of the invention includes a subcarrier mapper configured to receive a plurality of input symbols, configured to assign the plurality of input symbols to N logical subcarriers, configured to map the N logical subcarriers to N available physical subcarriers out of $N_{FFT}$ physical subcarriers, and configured to generate $N_{FFT}$ transmit symbols corresponding to the $N_{FFT}$ physical subcarriers. The transmitter further includes an inverse fast fourier transform (IFFT) processor configured to perform an inverse fourier transform on the $N_{FFT}$ transmit symbols output by the subcarrier mapper, and a parallel to serial converter configured to convert an output of the IFFT processor to a serial output stream.

The $N_{FFT}$ available physical subcarriers may include orthogonal subcarriers defined across a frequency band including a plurality of discontiguous available bandwidth segments, and the N available physical subcarriers may be distributed among the plurality of discontiguous available bandwidth segments.

The subcarrier mapper may be further configured to assign at least one pilot signal to at least one of the plurality of logical subcarriers, and the IFFT processor may be further configured to modulate each of the available physical subcarriers with data from a corresponding logical subcarrier. The subcarrier mapper may be further configured to set an input data signal corresponding to each of the plurality of unavailable physical subcarriers to zero.

The subcarrier mapper may be further configured to define a plurality of clusters in the discontiguous bandwidth segments, each of the clusters including a plurality contiguous subcarriers, configured to define an adaptive modulation and coding (AMC) subchannel including a plurality of contiguous clusters extending over a plurality of contiguous symbols, configured to allocate a first plurality of subcarriers within the AMC subchannel as pilot subcarriers, such that the pilot subcarriers are distributed uniformly across the AMC subchannel, and configured to allocate a second plurality of subcarriers within the AMC subchannel as data subcarriers.

The transmitter may further include a plurality of spreaders configured to spread the communications signals using a plurality of corresponding spreading codes, a combiner configured to combine the plurality of spread communications signals to form a combined communications signal, and a serial to parallel converter configured to convert the combined communications signal to parallel communications signals. The combiner may be further configured to combine the plurality of communications signals with a pilot signal.

The subcarrier mapper may be further configured to assign the parallel communications signals to respective ones of a plurality (N) of logical subcarriers, and configured to map the plurality of logical subcarriers to corresponding ones of the plurality of available physical subcarriers.

The subcarrier mapper may be further configured to assign at least one pilot signal to at least one of the plurality of logical subcarriers, and the IFFT processor may be further configured to modulate each of the available physical subcarriers with data from a corresponding logical subcarrier.

The subcarrier mapper may be further configured to set an input data signal corresponding to each of a plurality ($N_{FFT}$-N) of unavailable physical subcarriers to zero. The parallel communications signals and the at least one pilot signal may include N information signals corresponding to the available physical subcarriers, and the IFFT processor may be further configured to perform an $N_{FFT}$-point inverse fourier transform of the N information signals corresponding to the available physical subcarriers and the $N_{FFT}$-N input data signals corresponding to each of the plurality of unavailable physical subcarriers.

The transmitter may further include a parallel to serial converter configured to convert an output of the $N_{FFT}$-point inverse fourier transform to a serial data stream.

A transmitter for transmitting a plurality of communications signals over a plurality of discontiguous bandwidth segments in a frequency band according to further embodiments of the invention includes a plurality of spreaders configured to spread M data symbols for each of K users according to a corresponding spreading code having length L, and a plurality of combiners configured to combine the mth data symbols for each of the K users to provide M composite spread signals.

The transmitter further includes a plurality of serial to parallel converters configured to convert the M composite spread signals to M parallel input signals, and a frequency interleaver configured to interleave the M parallel input signals to provide Q interleaved input signals having a length N. The transmitter further includes a subcarrier mapper configured to assign the Q interleaved input signals to the N available physical subcarriers, and an inverse fast fourier transform (IFFT) processor configured to modulate N available physical subcarriers with the Q interleaved input signals.

The subcarrier mapper may be configured to assign zeros to $N_{FFT}$-N unavailable physical subcarriers to provide $N_{FFT}$ input signals, and the IFFT processor may be configured to perform an $N_{FFT}$ point inverse fourier transform on the $N_{FFT}$ input signals.

A receiver for a wireless communications system according to some embodiments of the invention includes a serial to parallel converter configured to convert a received symbol stream to an $N_{FFT}$ symbol wide parallel received symbol stream, and a fast fourier transform (FFT) processor configured to perform an $N_{FFT}$-point fourier transform on the parallel received symbol stream and to generate received symbols corresponding to $N_{FFT}$ subcarriers. The receiver further includes a subchannel demapper configured to select N symbols of the received symbols corresponding to the $N_{FFT}$ subcarriers, where the N selected symbols correspond to N available physical subcarriers out of the $N_{FFT}$ subcarriers, and configured to reconstruct a transmit data stream associated with the receiver from the N selected symbols.

The $N_{FFT}$ available physical subcarriers may include orthogonal subcarriers defined across a frequency band including a plurality of discontiguous available bandwidth segments, and the N available physical subcarriers may be distributed among the plurality of discontiguous available bandwidth segments.

The subcarrier demapper may be further configured to receive at least one pilot signal from at least one of the plurality of available physical subcarriers.

The subcarrier demapper may be further configured to receive a plurality of clusters in the discontiguous bandwidth segments, each of the clusters including a plurality of contiguous subcarriers, and configured to extract the at least one pilot signal from an adaptive modulation and coding (AMC) subchannel including a plurality of contiguous clusters extending over a plurality of contiguous symbols.

The subcarrier demapper may be further configured to extract a plurality of data symbols from data subcarriers in the AMC subchannel according to a scrambling sequence, such as a scrambling sequence defined by a Galois field and an offset. The scrambling sequence may be unique to a particular cell and/or sector of a wireless communications system.

The receiver may further include a parallel to serial converter configured to convert the reconstructed transmit data stream to a parallel communications signal, and a despreader configured to despread the parallel communications signals using a spreading code associated with the receiver.

A communications system according to some embodiments of the invention includes a transmitter and a receiver. The transmitter includes a subcarrier mapper configured to receive a plurality of input symbols, configured to assign the plurality of input symbols to N logical subcarriers, configured to map the N logical subcarriers to N available physical subcarriers out of $N_{FFT}$ physical subcarriers, and configured to generate $N_{FFT}$ transmit symbols corresponding to the $N_{FFT}$ physical subcarriers. The transmitter further includes an inverse fast fourier transform (IFFT) processor configured to perform an inverse fourier transform on the $N_{FFT}$ transmit symbols output by the subcarrier mapper, and a parallel to serial converter configured to convert an output of the IFFT processor to a serial output stream.

The receiver includes a serial to parallel converter configured to convert a received symbol stream to an $N_{FFT}$ symbol wide parallel received symbol stream, and a fast fourier transform (FFT) processor configured to perform an $N_{FFT}$-point fourier transform on the parallel received symbol stream and to generate received symbols corresponding to $N_{FFT}$ subcarriers. The receiver further includes a subchannel demapper configured to select N symbols of the received symbols corresponding to the $N_{FFT}$ subcarriers, where the N selected symbols correspond to N available physical subcarriers out of the $N_{FFT}$ subcarriers, and configured to reconstruct a transmit data stream associated with the receiver from the N selected symbols.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
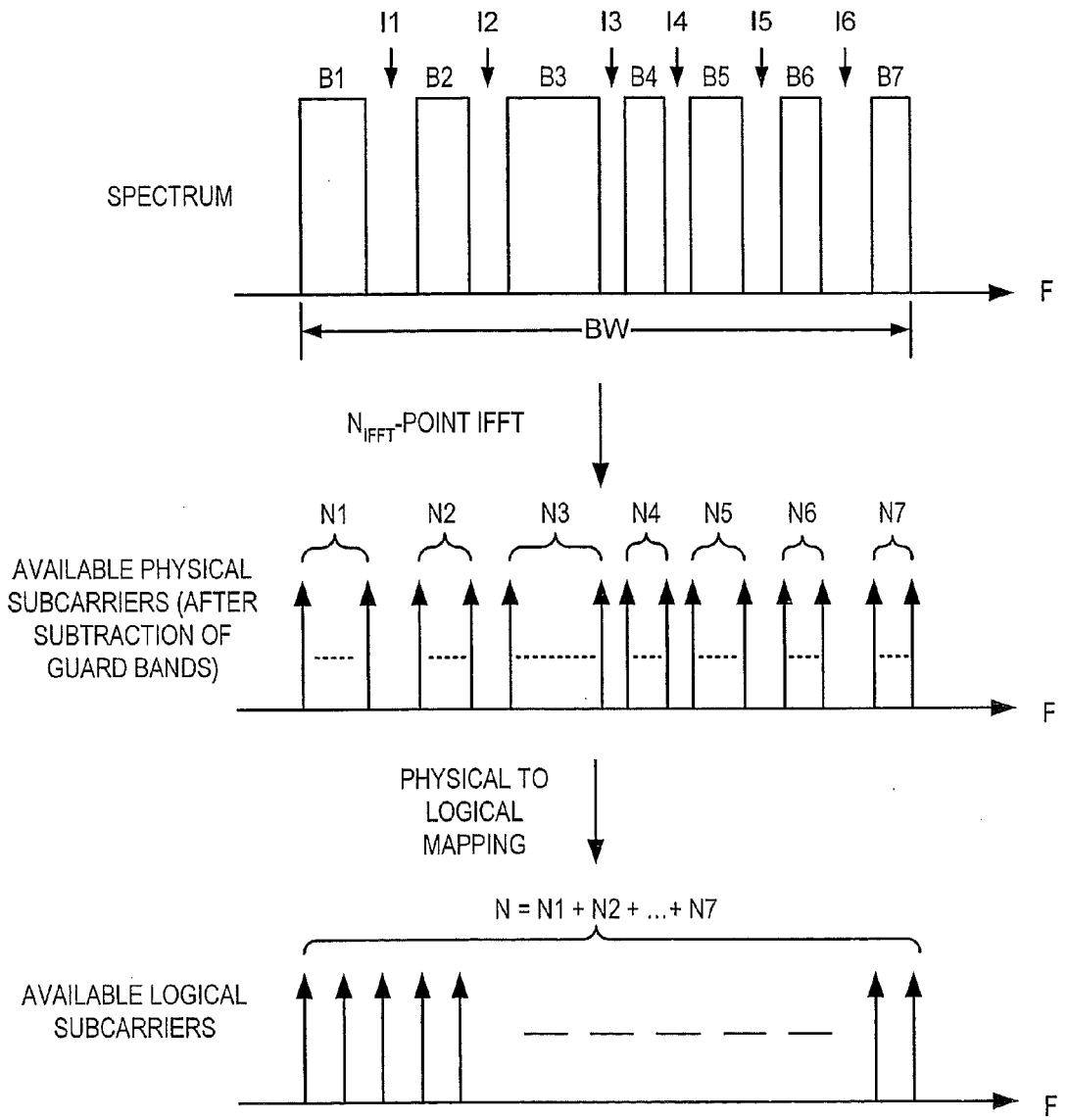
FIG. 1 is a schematic illustration of a discontiguous spectrum and available subcarriers.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Conventional wireless communication standards and/or protocols generally presume the availability of a contiguous spectrum for the entire bandwidth on which the air interface is implemented. This assumption may not be valid for all broadband wireless communications systems, due, for example, to the nature of existing and/or future spectrum allocations which may divide available frequencies into blocks that may be smaller than a desired broadband channel bandwidth. To provide more spectral efficiency and/or to improve the scalability of a communications system, some embodiments of the invention provide OFDMA and/or code division multiple access (CDMA) systems that may operate using a discontiguous spectrum over a wide bandwidth. Systems and/or methods according to some embodiments of the invention may improve the usage of a discontiguous spectrum over a wide bandwidth and/or may improve the spectral efficiency of a communications system.

Unlike 2G and/or 3G systems, future broadband wireless communications standards and/or protocols may support several features which may provide improved spectral efficiency and/or may provide more flexible system scalability. Such features may include orthogonal frequency division multiplexing (OFDM) using a multi carrier waveform, subchannelization, flexible channel sizes, adaptive modulation and coding (AMC), and/or multiple inputs and multiple outputs (MIMO) transmit & receive diversity with adaptive antenna systems (AAS). An OFDM system is a multi-carrier (MC) modulation system in which a serial symbol sequence is converted to parallel symbol sequences, which are used to modulate a plurality of mutually orthogonal sub-carriers through IFFT/FFT (Inverse Fast Fourier Transform/Fast Fourier Transform) processing. By decomposing the wideband spectrum into a plurality of orthogonal narrow band subcarriers, OFDM may provide excellent spectral efficiency and/or robustness against frequency selective fading and/or multi-path fading.

An OFDM-based multiple access scheme (Orthogonal Frequency Division Multiple Access, or OFDMA) may allow a plurality of users to share system resources in both the frequency domain (through allocation of subcarriers) and the time domain. For example, the current WiMax standard supports the OFDMA physical layer (PHY) mode with at least one of the FFT sizes ($N_{FFT}$) being 2048 (which is backwards compatible to 802.16-2004), 1024, 512 and/or 128. Having flexible FFT sizes facilitates the support of various channel bandwidths. An OFDM symbol includes several types of subcarriers, which include data subcarriers for data transmission, pilot subcarriers for various estimation purposes, and null carriers (no transmission at all) for guard bands and the DC carrier. The active subcarriers are divided into subsets of subcarriers. Each subset of subcarriers is termed a "subchannel." In the downlink (i.e. the link from a base station/satellite to a radioterminal), a subchannel may be intended for different groups of receivers; in the uplink (i.e. the link from the radioterminal to the base station/satellite), a transmitter may be assigned one or more subchannels, and several transmitters may transmit simultaneously. The subcarriers forming one subchannel may be either distributed (i.e. discontiguous) and/or adjacent to one another.

In OFDMA, a data region is a two-dimensional (time and frequency) allocation of a group of contiguous subchannels in a group of contiguous OFDM symbols. A data region can be transmitted in the downlink by the base station/satellite as a transmission to a radioterminal and/or a group of radioterminals.

In OFDMA systems and/or methods, data is mapped to available subchannels as follows. First, the data is segmented into blocks sized to fit into one OFDMA slot, and the slots are mapped such that the lowest numbered slot occupies the lowest numbered subchannel in the lowest numbered OFDM symbol. As the mapping is continued, the OFDM symbol index is increased. When the edge of the data region is reached, the mapping is continued from the lowest numbered OFDM symbol in the next available subchannel.

Depending on capacity and spectral mask requirements, subchannel allocation in the downlink may be performed using partial usage of the subchannels (PUSC), in which some of the subchannels are allocated to the transmitter, and/or full usage of the subchannels (FUSC), in which all subchannels are allocated to the transmitter. In the uplink, OFDMA subchannel allocation is typically performed with PUSC.

The OFDMA data is mapped to an OFDMA data region (or a group of slots) for both the downlink and the uplink. A slot in the OFDMA PHY definition includes both a time and a subchannel dimension for completeness and is the minimum possible data allocation unit. The definition of an OFDMA slot depends on the structure, which may vary for the uplink and the downlink, for FUSC and PUSC, and for the distributed subcarrier permutations and the adjacent subcarrier permutation.

For downlink FUSC using distributed subcarrier permutation, a slot is one subchannel by one OFDM symbol. For downlink PUSC using distributed subcarrier permutation, one slot is one subchannel by two OFDM symbols. For uplink PUSC using either of the distributed subcarrier permutations, one slot is one subchannel by three OFDM symbols. For uplink and downlink using the adjacent subcarrier permutation, one slot is one subchannel by one OFDM symbol.

The number of orthogonal subcarriers that make up an OFDM symbol is determined by the FFT size $N_{FFT}$. Subtracting the guard tones from $N_{FFT}$, one obtains the set of "used" subcarriers $N_{used}$. For both the uplink and the downlink, these used subcarriers are allocated to the pilot subcarriers and data subcarriers. However, there is a difference between the different possible zones. For FUSC, in the downlink, the pilot tones are allocated first, and the remaining subcarriers are divided into subchannels that are used exclusively for data. For PUSC in the downlink or in the uplink, the set of used subcarriers is first partitioned into subchannels, and then the pilot subcarriers are allocated from within each subchannel. Thus in FUSC, there is one set of common pilot subcarriers, but in PUSC, each subchannel contains its own set of pilot subcarriers.

The current WiMax standard always assumes the existence of a continuous spectrum for the entire bandwidth on which the IFFT/FFT processing is performed. Therefore, the standard specifies the subcarrier allocations for both downlink and uplink based on a contiguous set of available subcarriers. However, in some cases, such as a situation where a contiguous spectrum block may not be available, it may be desirable to transmit/receive communications signals using a discontiguous spectrum to improve spectral efficiency. A discontiguous spectrum may consist of a few discontiguous frequency bands in a certain spectrum segment, for example, the spectrum on the L-Band consisting of a few discontiguous frequency bands from 1626.5 MHz to 1660.5 MHz with total available spectrum about 11 MHz. Given such a spectrum, any frequency band that is smaller than 1.25 MHz may not be usable according to current standards, and/or any frequency band whose bandwidth is not an integral multiple of 1.25 MHz may not be fully utilized according to current standards.

As for a CDMA system, if the spread spectrum signal includes discontiguous frequency segments, the system may suffer performance loss due to the missing parts of the spectrum and/or due to interference from signals in the interstitial frequency band(s). Under the current cdma2000 standard, any frequency band that has less than 1.25 MHz contiguous bandwidth may not be used for the 1x system, and any frequency band that has less than 3.75 MHz contiguous bandwidth may not be used for the 3x system.

Thus, in conventional OFDMA and/or CDMA communications systems, a spectrum including discontiguous of frequency bands that are smaller than 1.25 MHz may not be fully utilized. Some embodiments of the present invention provide techniques that may make use of those smaller frequency bands as part of integral spectrum over which OFDMA and/or CDMA may be implemented. Accordingly, some embodiments of the invention may provide more spectral efficiency and/or system scalability for higher data rate communications in both the downlink and/or the uplink communications channels.

1. An OFDMA System with Discontiguous Spectrum

To operate an OFDMA system over a discontiguous spectrum that consists of a few frequency bands, there may be the following options for system design: a) operating only on frequency bands that have a continuous bandwidth of at least 1.25 MHz; and b) operating on wider bandwidth that may consist of discontinuous spectrum segments that may have a bandwidth less than 1.25 MHz. For Option a), the current WiMax standard may be readily used. However, using only contiguous 1.25 MHz bandwidth segments may compromise the spectral efficiency and/or scalability of a communications system. More specifically, portions of the spectrum smaller than 1.25 MHz may not be usable and therefore may be wasted. The exclusive use of 1.25 MHz bandwidth segments may also limit the system throughput for high-speed access, especially for the downlink. In order to implement Option (b), however, the systems must operate on a discontinuous bandwidth, which is not contemplated in the current standards.

Some embodiments of the invention provide designs in which the subcarriers that are used are only those that are contained within the available spectrum blocks, after subtracting the guard tones for each band. All of the subcarriers that belong to unavailable spectrum blocks may be tuned to zeros. A system/method according to some embodiments of the invention may have a high spectral efficiency, in that it may allow efficient use of portions of frequency bands that may otherwise be wasted. Having a wider bandwidth operation may also provide more flexibility for throughput, which may potentially result in higher data rate access in both the downlink and the uplink.

The formation of a subchannel in an OFDMA system typically involves a two-dimensional (frequency-time) distributed permutation. As used herein, the term "permutation" refers to a distribution and/or arrangement of pilot signals and data signals in an AMC subchannel in such a manner that a receiver may use the pilot signals to accurately estimate channels associated with the subcarriers. However, the distributed subcarrier permutation may only be suitable for a contiguous spectrum, because the data and/or pilot subcarriers that form a subchannel may be uniformly distributed through the entire band. For a discontiguous spectrum, the distributed subcarrier permutation may no longer be valid, because some of the potential subcarriers may not be available. Accordingly, some embodiments of the invention provide new subcarrier permutation schemes for use with a discontiguous spectrum.

Referring to FIG. 1, to illustrate an OFDMA system employed over a discontiguous spectrum, as an example, a frequency bandwidth of BW is shown that consists of a few discontiguous spectrum segments $B_1$, $B_2$, ..., and $B_7$ separated by interstitial segments I1-I6 that are not available to the system. The OFDMA system is assumed to have an $N_{FFT}$-point IFFT/FFT over the entire bandwidth of BW. The subcarrier spacing is $\Delta f = F_s/N_{FFT}$ where $F_s$ is sampling frequency given by floor(8/7·BW/8000)×8000. The subcarriers falling in the unavailable spectral segments within BW may be turned off (i.e. set to zero). To limit out-of-band emission for each spectral segment, a few guard subcarriers at both sides of each spectrum segment may be set to zero. After setting all the unusable subcarriers to zero, the usable subcarriers in each spectrum segment include $N_1$ subcarriers in Segment $B_1$, $N_2$ subcarriers in Segment $B_2$, $N_3$ subcarriers in Segment $B_3$, $N_4$ subcarriers in Segment $B_4$, $N_5$ subcarriers in Segment $B_5$, $N_6$ subcarriers in Segment $B_6$, and $N_7$ subcarriers in Segment $B_7$. Therefore, the total number of usable subcarriers is given by $N=N_1+N_2+\ldots+N_7$ after turning off all of the guard subcarriers. The Nusable physical subcarriers are then mapped to N logical subcarriers. Moreover, since some of the potential physical subcarriers are not used, in general $N<N_{FFT}$.

Due to the lack of available subcarriers between two adjacent segments, a subchannel allocation according to some embodiments of the invention may be based on an adjacent subcarrier permutation within a segment. The adjacent subcarrier permutation may apply to both the uplink and the downlink symbols. Symbol data within a subchannel may be assigned to adjacent subcarriers within a spectrum segment, and the data and pilot subcarriers may be assigned fixed positions in the frequency domain in an OFDM symbol.

Figure 2:
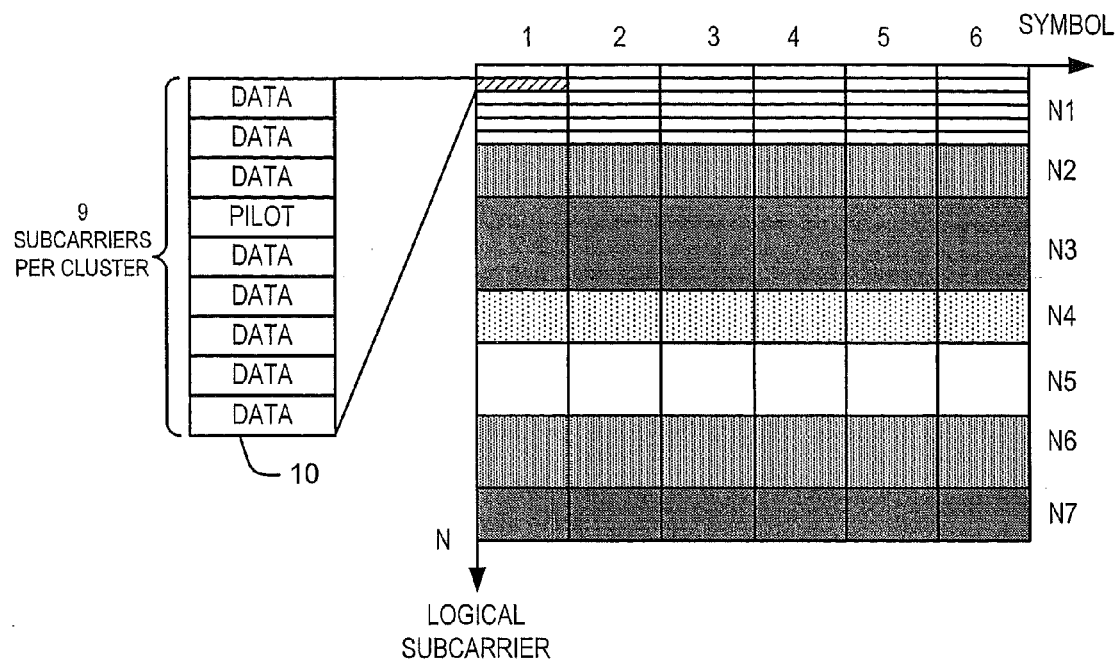
FIG. 2 is a schematic illustration of a scheme for the logical subcarrier allocation according to some embodiments of the invention.
Figure 3:
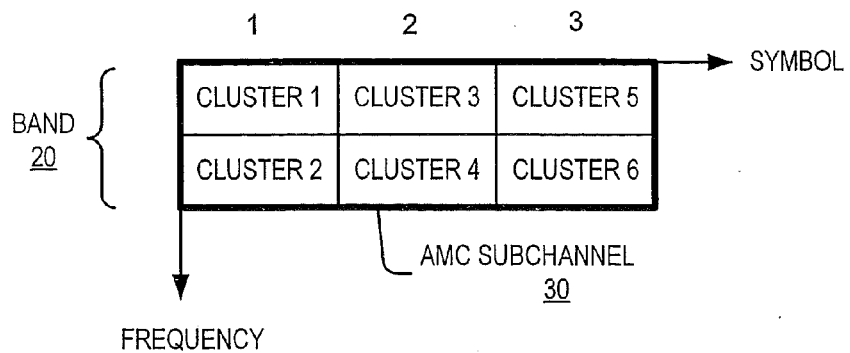
FIG. 3 is a schematic illustration of a structure of an adaptive modulation and coding (AMC) subchannel according to some embodiments of the invention.

FIG. 2 shows a scheme for the logical allocation of subcarriers according to some embodiments of the invention. As used herein, a basic OFDMA allocation unit is called cluster, which is a set of contiguous subcarriers within a spectrum segment in an OFDM symbol. As shown in FIG. 2, a cluster 10 is a set of 9 contiguous subcarriers within a spectrum segment. In some embodiments, a group of 2 logical consecutive clusters 10 in an OFDM symbol is defined as a band. In the subchannel allocation, 6 contiguous clusters in a same band are grouped to form an AMC (Adaptive Modulation and Coding) subchannel. FIG. 3 shows the structures of a band 20 and an AMC subchannel 30 according to some embodiments of the invention.

Figure 4:
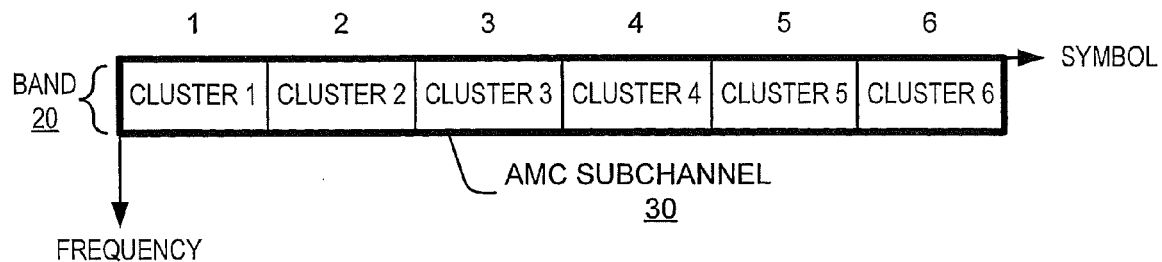
FIG. 4 is a schematic illustration of a structure of an AMC subchannel according to further embodiments of the invention.

In some embodiments, a typical AMC subchannel 30 includes 2 clusters in each of three consecutive OFDM symbols with 6 pilot subcarriers and 48 data subcarriers. In other embodiments, a band 20 is the same as a cluster 10 in an OFDM symbol. To assign 6 contiguous clusters 10 in a same band 20 to form an AMC subchannel 30, a subchannel consisting of 1 cluster in each of six consecutive OFDM symbols may be defined as shown in FIG. 4.

The pilot signals are transmitted on the subchannel band to allow a base station/satellite to estimate the channel. Because of the discontiguous spectrum, the adjacent subcarrier permutation allows radioterminals to effectively estimate the channel response and/or a performance metric, such as the carrier-to-interference and noise ratio (CINR), of the assigned subchannel.

Figure 5:
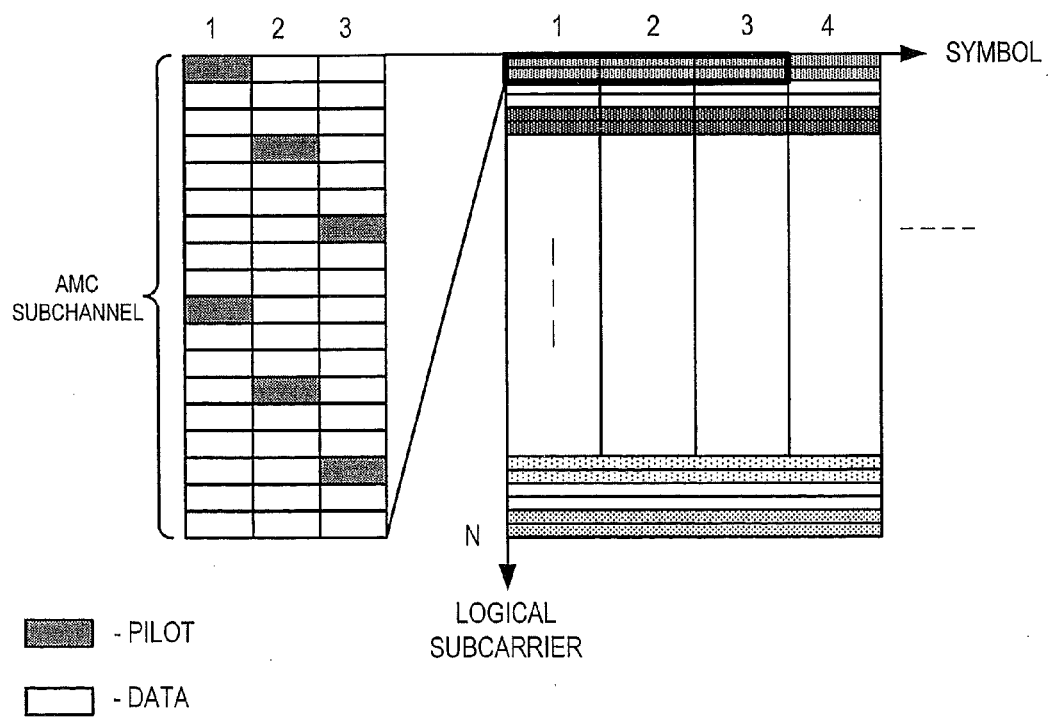
FIG. 5 is a schematic illustration of a subcarrier allocation for an AMC subchannel according to some embodiments of the invention.

It may be desirable to allocate pilot subcarriers such that the pilot subcarriers are uniformly distributed in an AMC subchannel. Accordingly, in some embodiments, the pilot subcarriers for an AMC subchannel may be allocated at locations determined by the indices of logical subcarriers in an OFDM symbol as follows:

$$\text{pilot\_subs}(n, k) = 9n + 3m + 1 \quad (1)$$

$$\text{for } n = 0, 1, \ldots, \left\lceil \frac{N}{9} \right\rceil,$$

where n is the index number of a pilot subcarrier in an OFDM symbol
N is the total number of logical subcarriers,
k is the index of the OFDM symbol
m is given by k mod 3
$\lceil X \rceil$ denotes the largest integer not greater than X FIG. 5 shows the locations of the pilot subcarriers within an AMC subchannel according to the allocation scheme described above. As seen in FIG. 5, the pilot subcarriers may be uniformly distributed among the available logical subcarriers in an OFDM symbol, and may be offset by 2 subcarriers between adjacent OFDM symbols, which may make the channel estimates more efficient. The remaining subcarriers are allocated for data.

With the adjacent subcarrier AMC subchannel allocation described above, the OFDMA system may be able to detect the CINR of each pilot subcarrier, and then interpolate the CINRs of the pilot subcarriers to obtain estimates of the CINRs of the data subcarriers in each subchannel The radioterminal may feed back the CINRs of the subcarriers to the base station/satellite, and the base station/satellite, using adaptive modulation and coding (AMC), may assign an AMC subchannel having the best average CINR for the radioterminal and/or may assign a proper modulation and coding scheme (MCS) based on the CINRs. Since the AMC subchannel scheme is based on the two dimensional (frequency-time) subchannel allocations, transmission capacity to multiple users in a cell may be increased. The adaptive assignment of an AMC subchannel according to the channel state of a user may allow service provisioning in compliance with the characteristics of the radioterminal. Also, the adjacent subcarrier permutation for a subchannel may facilitate the implementation of an adaptive antenna system (AAS) on a per subchannel basis.

For a terrestrial cellular OFDMA communications system with a frequency reuse ratio of 1, it may be desirable to consider both the cell-specific identification and the minimization of co-channel interference in a multi-cell subchannel allocation. In particular, it may be desirable to discriminate between pilot signals from each cell. To accomplish this, for example, the pilot subcarriers may be spread using orthogonal pseudonoise (PN) codes that are unique for each cell. Thus a radioterminal may demodulate the pilot signal with the PN code specific to its serving cell (or base station/satellite), thereby obtaining an estimate of the channel response and/or CINR of each subcarrier. For an AMC subchannel, the location of data subcarriers may coincide with other AMC subchannels (in other cells) for the same band. In that case, a radioterminal may fail to decode the desired signal even with a reasonable signal to interference plus noise ratio (SINR) if the two cells use the same AMC scheme. Thus, it may be desirable for each cell to have a unique AMC assignment scheme such that the assignment of subcarriers is different for each cell.

To address this issue, in some embodiments of the invention, the order of subcarrier mapping within an AMC subchannel may be scrambled with a sequence that is unique to each cell, to thereby provide a systematic permutation of the subcarrier assignments in each cell/sector. By scrambling the subcarrier mapping sequences, the number of collisions between any two cells may be reduced. A cell and a subchannel for the cell may be identified through the permutation of a basic sequence defined in Galois Field ($7^2$), i.e., GF(49) and an offset. The basic GF(49) sequence is based on the prime polynomial as follows:

$$p(x)=x^2+2x+3 \quad (2)$$

The basic sequence consists of the field elements of GF($7^2$) that can be written as $$Q=\{\alpha,\alpha^2,\ldots,\alpha^{48}\} \quad (3)$$

and their polynomial representation is given by the remainder of $x^n$ upon division by the prime polynomial p(x):

$$\alpha^n = \text{Remainder}\left\{\frac{x^n}{p(x)}\right\}, n = 1, 2, \ldots, 48 \quad (4)$$

The field elements of GF(49) are derived with different representations, and the results are shown in Table 1.

TABLE 1

The GF(49) Field Elements Generated Using the Prime Polynomial in (x)

| Exponential Represent. | Polynomial Represent. | Hepta Represent | Decimal Represent |
|---|---|---|---|
| $a^1$ | x | 10 | 7 |
| $a^2$ | 5x + 4 | 54 | 39 |
| $a^3$ | x + 6 | 16 | 13 |
| $a^4$ | 4x + 4 | 44 | 32 |
| $a^5$ | 3x + 2 | 32 | 23 |
| $a^6$ | 3x + 5 | 35 | 26 |
| $A^7$ | 6x + 5 | 65 | 47 |
| $a^8$ | 3 | 03 | 3 |
| $a^9$ | 3x | 30 | 21 |
| $a^{10}$ | x + 5 | 15 | 12 |
| $a^{11}$ | 3x + 4 | 34 | 25 |
| $a^{12}$ | 2x + 2 | 22 | 16 |
| $a^{13}$ | 2x + 6 | 26 | 20 |
| $a^{14}$ | 2x + 1 | 21 | 15 |
| $a^{15}$ | 4x + 1 | 41 | 29 |
| $a^{16}$ | 2 | 02 | 2 |
| $a^{17}$ | 2x | 20 | 14 |
| $a^{18}$ | 3x + 1 | 31 | 22 |
| $a^{19}$ | 2x + 5 | 25 | 19 |
| $a^{20}$ | x + 1 | 11 | 8 |
| $a^{21}$ | 6x + 4 | 64 | 46 |
| $a^{22}$ | 6x + 3 | 63 | 45 |
| $a^{23}$ | 5x + 3 | 53 | 38 |
| $a^{24}$ | 6 | 06 | 6 |
| $a^{25}$ | 6x | 60 | 42 |
| $a^{26}$ | 2x + 3 | 23 | 17 |
| $a^{27}$ | 6x + 1 | 61 | 43 |
| $a^{28}$ | 3x + 3 | 33 | 24 |
| $a^{29}$ | 4x + 5 | 45 | 33 |
| $a^{30}$ | 4x + 2 | 42 | 30 |
| $a^{31}$ | x + 2 | 12 | 9 |
| $a^{32}$ | 4 | 04 | 4 |
| $a^{33}$ | 4x | 40 | 28 |
| $a^{34}$ | 6x + 2 | 62 | 44 |
| $a^{35}$ | 4x + 3 | 43 | 31 |
| $a^{36}$ | 5x + 5 | 55 | 40 |

TABLE 1-continued

The GF(49) Field Elements Generated Using the Prime Polynomial in (x)

| Exponential Represent. | Polynomial Represent. | Hepta Represent | Decimal Represent |
|---|---|---|---|
| $a^{37}$ | 5x + 1 | 51 | 36 |
| $a^{38}$ | 5x + 6 | 56 | 41 |
| $a^{39}$ | 3x + 6 | 36 | 27 |
| $a^{40}$ | 5 | 05 | 5 |
| $a^{41}$ | 5x | 50 | 35 |
| $a^{42}$ | 4x + 6 | 46 | 34 |
| $a^{43}$ | 5x + 2 | 52 | 37 |
| $a^{44}$ | 6x + 6 | 66 | 48 |
| $a^{45}$ | x + 3 | 13 | 10 |
| $a^{46}$ | x + 4 | 14 | 11 |
| $a^{47}$ | 2x + 4 | 24 | 18 |
| $a^{48}$ | 1 | 01 | 1 |

The GF(49) permutation basic sequence may be expressed in decimal representation as $$Q=\{7,39,13,32,23,26,47,3,21,12,25,16,20,15,29,2,14,\\22,19,8,46,45,38,6,42,17,43,24,33,30,9,4,28,44,\\31,40,36,41,27,5,35,34,37,48,10,11,18,1\} \quad (5)$$

In an AMC subchannel, after mapping the 6 pilot subcarriers (i.e. one per cluster of the subchannel), the remaining 48 subcarriers (i.e. 8 per cluster) may be used for the traffic data. As shown in FIG. 5, within an AMC subchannel, the traffic data subcarriers are indexed from 1 to 48 starting with the first in the first cluster, and increasing along the subcarriers first, then by cluster. To reduce potential co-channel interference and/or to enable the identification of a cell in a multi-cell environment with a frequency reuse ratio of 1, the data subcarriers of an AMC channel may be permutated using a permutation base sequence such as the permutation sequence Q with cell identification. For this permutation scheme, the data subcarrier for the $k^{th}$ user in the $n^{th}$ Cell may be mapped to the subcarrier of a subchannel according to the following equation:

$$\text{subcarrier}(k, n) = \begin{cases} Q_m(k) + \left(\lceil \frac{n}{48} \rceil\right) \text{mod} 49 & \text{if } \left\{Q_m(k) + \left(\lceil \frac{n}{48} \rceil\right) \text{mod} 49\right\} \text{mod} 49 \neq 0 \\ \left(\lceil \frac{n}{48} \rceil\right) \text{mod} 49 & \text{if } \left\{Q_m(k) + \left(\lceil \frac{n}{48} \rceil\right) \text{mod} 49\right\} \text{mod} 49 = 0 \end{cases} \quad (6)$$

where
m=n mod 48
$Q_m(k)$=the $k^{th}$ element of the left cyclic shifted version of permutation base sequence Q by m
X mod Y=remainder of X/Y, and
⌈X⌉ denotes largest integer not greater than X.

Figure 6:
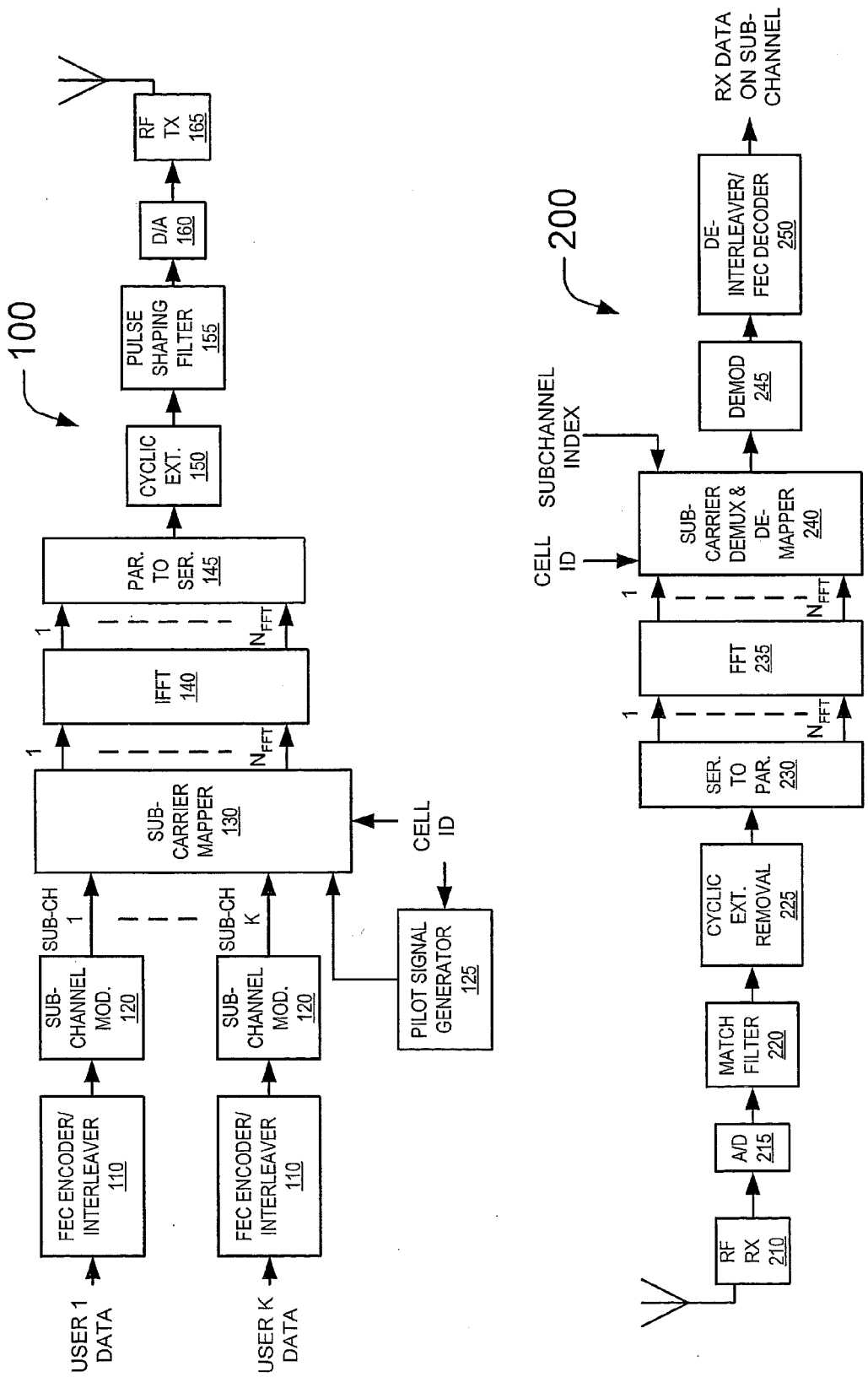
FIG. 6 is a block diagram of OFDMA systems/methods according to some embodiments of the invention for use with a discontiguous spectrum.

FIG. 6 shows a block diagram for OFDMA systems and/or methods including an OFDM transmitter 100 and an OFDM receiver 200 configured to communicate over a discontiguous spectrum according to some embodiments of the invention.

As shown in FIG. 6, in a transmitter 100, data is divided into K subchannels which are individually subjected to forward error correction in forward error correction blocks 110, interleaving via bit interleavers 115, and subchannel modulation in subchannel modulation blocks 120. The modulated subchannel signals are provided to a subchannel bank mapper 130 which is configured to map logical subchannel data and pilot signals generated by a pilot signal generator 125 to physical subchannels using cell identification numbers.

The cell identification number may be related to a specific base station in a terrestrial OFDMA cellular system or a particular spot-beam in a multiple beam satellite OFDMA system.

The mapped subchannel streams are then processed according to conventional OFDM methods. Namely, the mapped subchannel streams are processed by an Inverse Fast Fourier Transform (IFFT) block 140 and converted to a serial stream by a parallel to serial conversion block 145. A cyclic extension is then appended to the serialized stream by a cyclic extension block 150 in order to mitigate inter-symbol interference, and the resulting pulse stream is processed by a pulse shaping filter 155. The pulse stream is then converted to analog via a digital to analog converter 160 and transmitted by transmitter 165.

In a receiver 200, the transmitted waveform is received by an RF receiver front end 210, converted to digital by an analog to digital converter 215, and filtered by a match filter 220. The cyclic extension is stripped from the data stream by a cyclic extension removal block 225.

The resulting data stream is converted to parallel by a serial to parallel converter 230 and processed by an Fast Fourier Transformer (FFT) 235, according to conventional OFDM processing techniques.

The resulting subchannel information is then demultiplexed and de-mapped into logical subchannel information by a subchannel demultiplexer/de-mapper 240 utilizing cell identification numbers as well as subchannel indices. The resulting reconstructed data stream is then the demodulated via a demodulator block 245, de-interleaved by a deinterleaver 250 and decoded by a forward error correction decoder 255 to reconstruct the transmitted data.

A permutation scheme according to embodiments of the invention may systematically provide not only a means of identifying a particular base station or spot-beam in an OFDMA communications system, but also methods for reducing co-channel interference between subchannels of different base stations and/or spot-beams in an OFDMA communications system with a frequency reuse ratio of 1. The scheme may be extended to a cellular system with multi-sector cells by applying the permutation method to each sector having the same frequency band among different cells.

2. A CDMA System with Discontiguous Spectrum

A direct sequence (DS) spread spectrum CDMA system typically operates using a contiguous spectrum due to the nature of bandwidth spreading in a CDMA system. Otherwise, the performance of the DS-CDMA system may be compromised because the missing spectrum may result in partial loss of the CDMA signal and/or interference from some interstitial frequencies. However, according to some embodiments of the invention, instead of applying spreading sequences in the time domain as is customary, spreading sequences may be applied in the frequency domain by mapping different chips of a spreading sequence to individual OFDM subcarriers over discontiguous bandwidth segments. Such a system may be referred to as a discontiguous multicarrier (MC) CDMA system. In a discontiguous MC-CDMA system according to some embodiments of the invention, each OFDM subcarrier may have a data rate that is the same as the original input data rate, and the chip data may be distributed across multiple subcarriers. Since different chips of a spreading sequence are mapped to individual OFDM subcarriers, it is possible according to some embodiments of the invention to send a CDMA signal through a discontiguous spectrum by using only those subcarriers that are available to the system.

Generally, in an MC-CDMA system according to embodiments of the invention, the transmitted signal of the $i^{th}$ data symbol of the $k^{th}$ user, as a function of time, may be written as $$y_i^k(t) = \sum_{n=0}^{N_{FFT}-1} b_i^k q_n^k e^{j2\pi(f_0+n\Delta f)t} p(t - iT) \qquad (7)$$

$$= \sum_{n=0}^{N_{FFT}-1} s_i^k(n) e^{j2\pi(f_0+n\Delta f)t} p(t - iT)$$

where
$N_{FFT}$ is the number of IFFT/FFT points, i.e., the number of subcarriers available in the entire bandwidth BW
$b_i^k$ is the $i^{th}$ data symbol of the $k^{th}$ user
$f_o$ is the lowest subcarrier frequency
$q_n^k$ is the $n^{th}$ element of the sequence of $N_{FFT}$ elements that is related to the spreading sequence of the $k^{th}$ user
$\Delta f$ is the subcarrier spacing given by 1/T
$s_i^k(n) = b_i^k q_n^k$, is the subcarrier data sequence, and $$p(t) \equiv \begin{cases} 1 & \text{for } 0 \le t \le T \\ 0 & \text{otherwise} \end{cases}$$

With a discontiguous spectrum, some of the $N_{FFT}$ subcarriers may not be available, as shown in FIG. 1. The unavailable subcarriers may be turned off or set to zero. The remaining subcarriers that fall inside available frequency segments are mapped to the logical subcarriers sub_L(n), n=0, 1, ..., N-1, N<$N_{FFT}$. The logical subcarriers may be used to transmit the chip level signal. For example, if the number of chips per symbol is equal to N, then the chip level signal for the $i^{th}$ symbol of the $k^{th}$ user may be represented by $$w_i^k(n) = b_i^k c_n^k, n=0, 1, \ldots, N-1, \qquad (8)$$

where $c_n^k$ is the $n^{th}$ chip of the spreading sequence of the $k^{th}$ user.

The chip level signal may be mapped to the logical subcarriers one by one as follows:

$$sub\_L(n) = w_i^k(n), n=0, 1, \ldots, N-1 \qquad (9)$$

Figure 7:
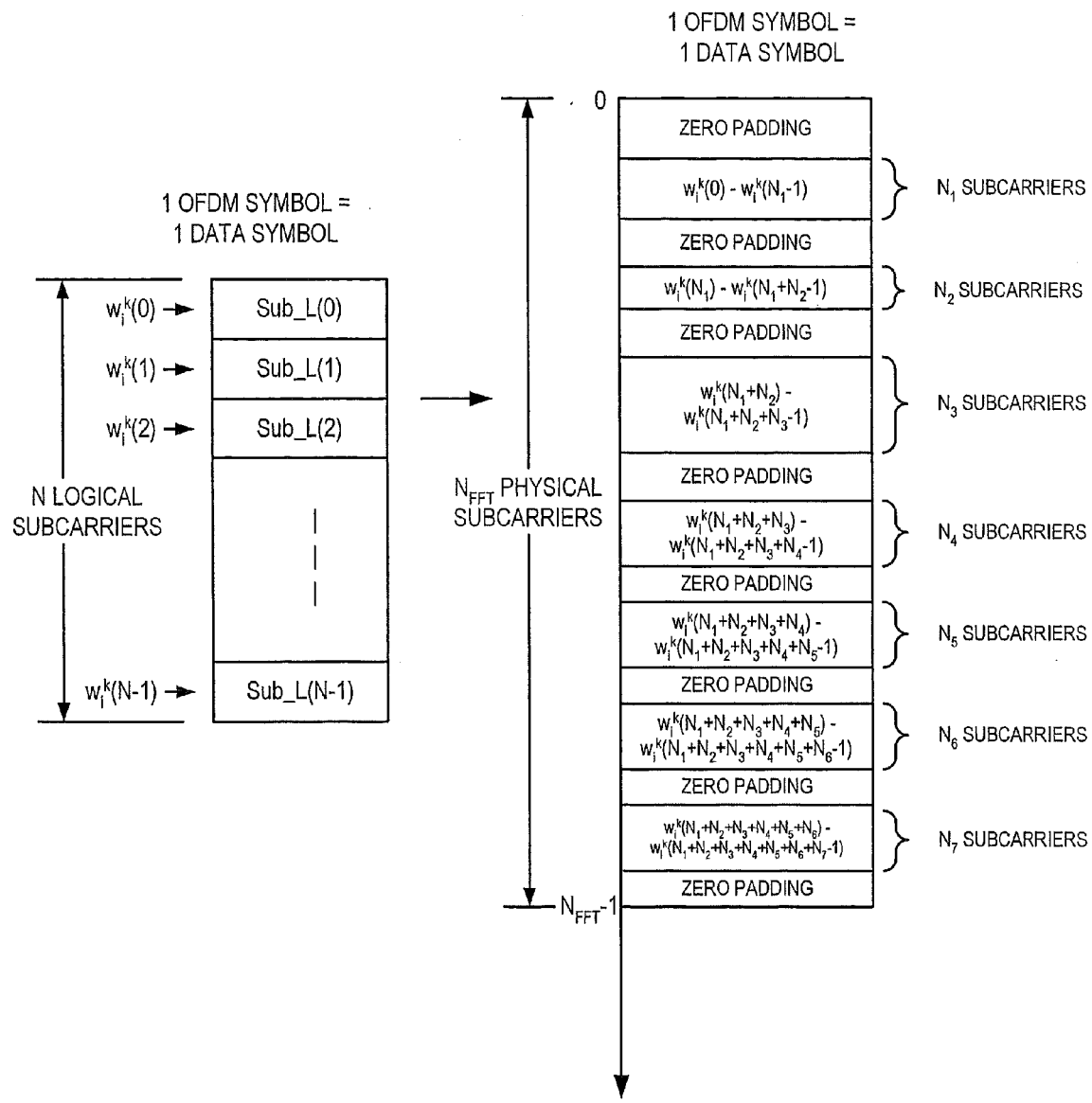
FIG. 7 is a schematic illustration of a chip level mapping between logical and physical subcarriers according to some embodiments of the invention.

The mapping of logical subcarriers to physical subcarriers may be performed based on the availability of physical subcarriers, after excluding the unavailable subcarriers and those falling in guard-bands. The excluded physical subcarriers may be padded with zeros. Then the logical subcarriers may be mapped to the remaining physical subcarriers one by one in order from the lowest available physical subcarrier to the highest available physical subcarrier. FIG. 7 illustrates a mapping procedure in which one CDMA data symbol is mapped to one OFDM symbol (e.g., when the number of chips in the spreading sequence is equal to the number of available physical subcarriers). As a result, the physical subcarrier data sequence $s_i^k(n)$ in Equation (7) is equal to the mapped physical subcarrier sequence as shown in FIG. 7. If the indices of the available physical subcarriers are given by ps_index(m), n=0, 1, ..., N-1, which are integers in the range of (0, $N_{FFT}-1$), then the mapped physical subcarrier sequence $s_i^k(n)$, n=0, 1, ..., $N_{FFT}-1$ may be written as $$s_i^k(n) = \begin{cases} w_i^k(m) & \text{for } n = \text{ps\_index}(m), m = 0, 1, \ldots, N-1 \\ 0 & \text{otherwise} \end{cases} \qquad (10)$$

With the mapped physical subcarrier sequence and Equation (7), the transmitted signal of the $i^{th}$ data symbol of the $k^{th}$ user may be written as $$y_i^k(t) = \sum_{n=0}^{N_{FFT}-1} s_i^k(n) e^{j2\pi(f_0 + n\Delta f)t} p(t - iT) \quad (11)$$

$$= \sum_{m=0}^{N-1} w_i^k(m) e^{j2\pi(f_0 + ps\_index(m)\Delta f)t} p(t - iT)$$

For a system with total of K users, the transmitted signal is a composite superposition of all chip level subcarrier sequences. The unique spreading sequence $c_n^k = 0, 1, \ldots, N-1$ separates other users from the $k^{th}$ user, provided that the spreading sequences of the users are orthogonal to each other.

Figure 8:
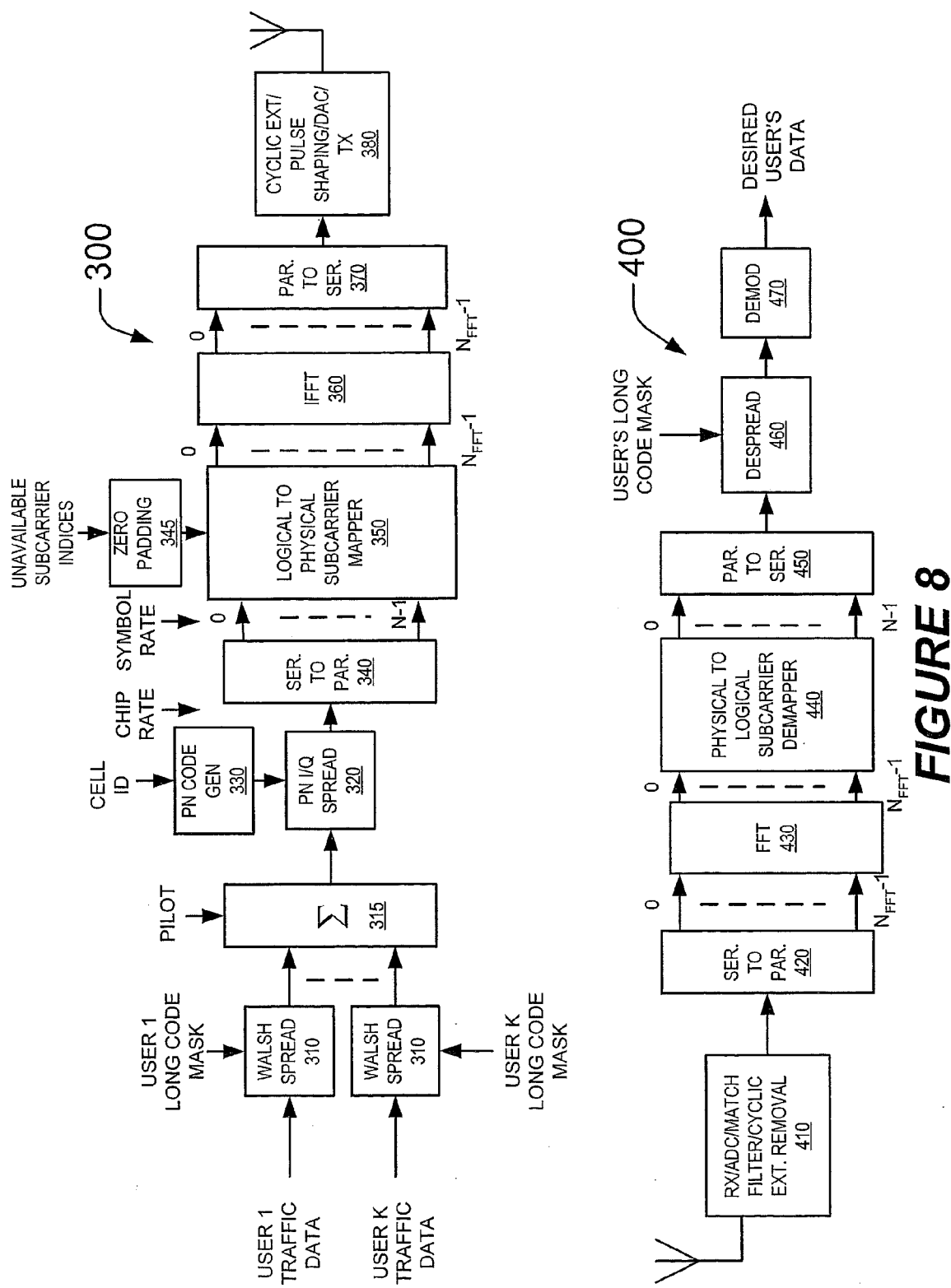
FIG. 8 is a block diagram of CDMA systems/methods according to some embodiments of the invention for use with discontiguous spectrum.

FIG. 8 is a block diagram illustrating systems and/or methods according to some embodiments of the invention. Referring to FIG. 8, a transmitter 300 configured to transmit a data signal using discontiguous MC-CDMA is illustrated. As shown therein, K users' traffic data is spread using user-specific long spreading codes via spreaders 310. The resulting signals are combined along with a pilot signal in a combiner 315, and the combined signal is spread with a covering code unique to the cell via a spreader 320.

The resulting data stream is converted to parallel signals via a serial to parallel converter 340, and the parallel data streams are mapped to physical subcarriers via a logical to physical subcarrier mapper 350. Unavailable subcarriers and guardband subcarriers are padded with zeros by a zero padding block 345 using indices of unavailable subcarriers. The resulting physical subcarrier mapping is processed by an IFFT 360 and converted to a serial data stream by a parallel to serial converter 370, according to conventional OFDM processing techniques. Cyclic extension, pulse shaping, digital to analog conversion and/or transmission may then be performed on the serial data stream by a transmitter block 380.

In a receiver 400, as shown in FIG. 8, the transmitted signal is received via a receiver front end 410 which may also perform analog-to-digital conversion, and match filtering. The transmitted subcarriers in an OFDM symbol are recovered using an FFT operation in an FFT block 430 after sampling the received signal at the chip rate and converting the received signal to parallel via a serial to parallel converter 420. The recovered physical subcarriers are then converted to the logical subcarrier sequence in a physical to logical subcarrier demapping block 440. The resulting signal, which corresponds to the chip level signal in a symbol is then converted to a serial data stream by a parallel to serial converter 450. After despreading the chip level signal via a despreader 460, the user symbol level data is recovered by a demodulator 470. The received $m^{th}$ logical subcarrier of the $i^{th}$ symbol may be expressed as $$r_{m,i} = \sum_{k=0}^{K-1} H_m w_i^k(m) + n_{m,i} \quad (12)$$

$$= \sum_{k=0}^{K-1} H_m b_i^k c_m^k + n_{m,i}$$

where $H_m$ is the channel frequency response of the $m^{th}$ logical subcarrier, K is the total number of users, and $n_{m,i}$ is the corresponding noise term. To recover the $k^{th}$ user data symbol, the MC-CDMA receiver may de-spread the received chip level signal by multiplying $r_{m,i}$ in Equation (12) by the $k^{th}$ user's spreading sequence $c_m^k$ and by the reciprocal of the channel estimate of subcarrier m, m=0, 1, . . . , N-1. The resulting products are summed. Therefore, the decision statistic for the $k^{th}$ user in the $i^{th}$ symbol is given by $$\hat{d}_i^k = \sum_{m=0}^{N-1} c_m^k \hat{\alpha}_m r_{m,i} \quad (13)$$

where $\hat{\alpha}_m$ is the reciprocal of the channel estimate of subcarrier m, which may be obtained by using the pilot signal.

In the foregoing example, the number of logical subcarriers N is assumed to be equal to the spreading factor. However, that may not always be the case. For example, in some cases, the number of logical subcarriers N may be larger than the spreading factor L. In that case, a modified system may offer more flexibility in the system design.

Figure 9:
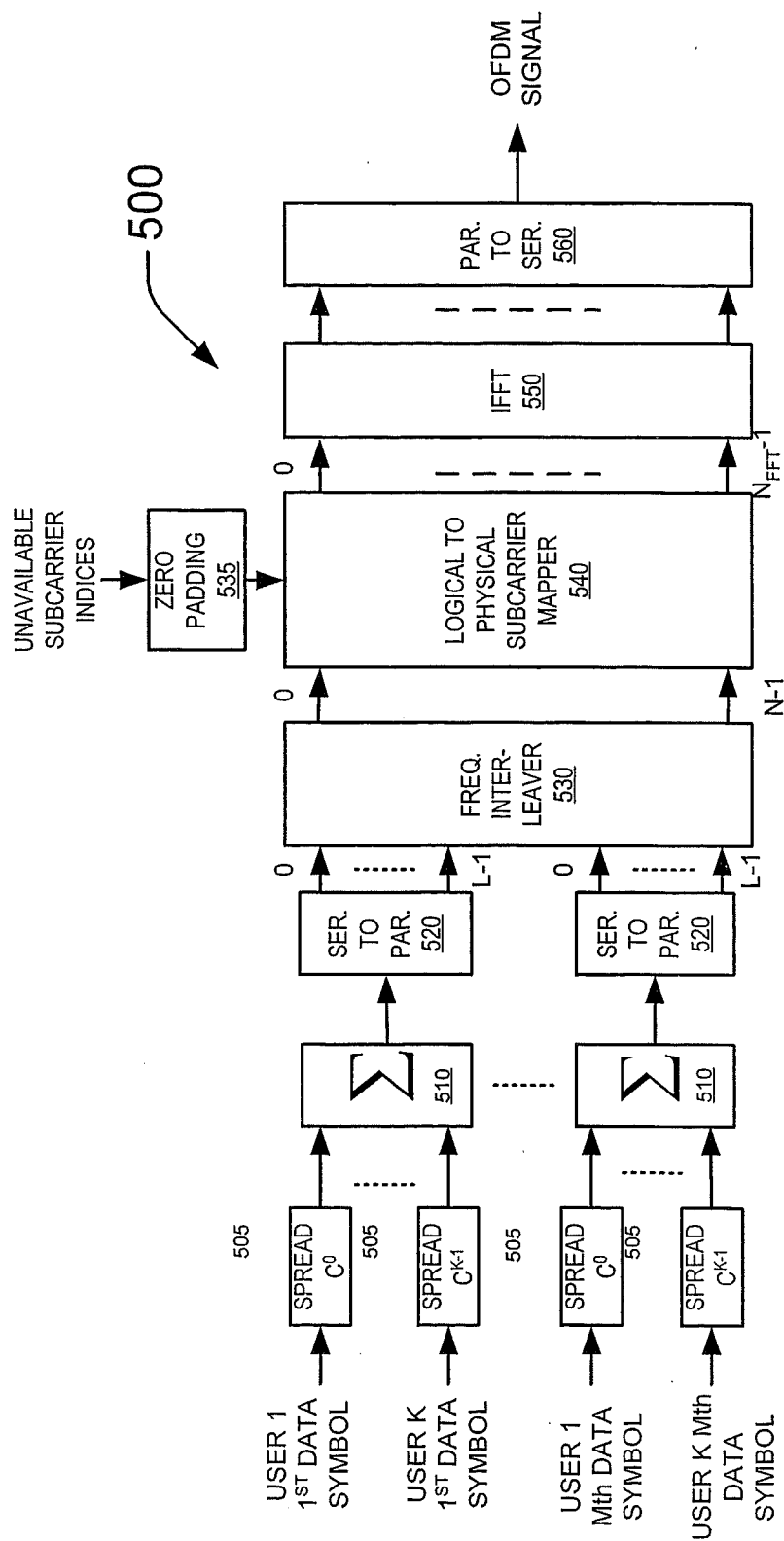
FIG. 9 is a block diagram of CDMA transmit systems/methods according to further embodiments of the invention for use with a discontiguous spectrum.

FIG. 9 shows a modified system that may take several data symbols per user in parallel. The transmit system forms M groups of data symbols from K users, where the first group consists of the first data symbol of each user, and the second group consists of the second data symbol of each user, and so on. Thus M data symbols of K users are considered at a time. As shown in FIG. 9, the data symbols in each group are spread by their corresponding spreading sequences via spreaders 505 and then are added up by combiners 510. The spreading sequence $c^k$ for the $k^{th}$ user is defined as $c^k = [c_0^k \, c_1^k \ldots c_{L-1}^k]$. The summation of the chip level sequences is series-to-parallel converted via serial to parallel converters 520, and sent to a frequency interleaver 530 in parallel along with those from other groups. The frequency interleaver transforms the M×L subcarrier data matrix to an N x Q (where Q is an integer) subcarrier data matrix. The interleaved subcarrier data matrix is then mapped to N logical subcarriers per symbol of Q OFDM symbols in logical to physical subcarrier mapping block 540. The logical subcarriers in an OFDM symbol are mapped to physical subcarriers in the manner discussed previously. The frequency interleaver may also provide frequency diversity for a user by distributing subcarriers across an entire frequency bandwidth. The resulting subcarrier data are processed though an IFFT 550 and converted to serial in a parallel to serial converter 560 to form the OFDM signal.

As noted above, the frequency interleaver transforms the M×L subcarrier data matrix to an N×Q subcarrier data matrix. Thus, as an example, if there are 48 available physical subcarriers (N=48), 12 symbols (M=12) taken from each of K users, and the spreading factor is 16 (L=16), then M×L=192. Thus, the Q dimension equals 192/48, or 4. Thus, the frequency interleaver 530 forms a subcarrier matrix having dimensions 48×4. Thus, 4 OFDM symbols may be used to encode 12 symbols from K different users.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:
1. A transmitter for a wireless communications system, comprising:
 a subcarrier mapper configured to receive a plurality of input symbols, configured to assign the plurality of input symbols to N logical subcarriers, configured to map the N logical subcarriers to N available physical subcarriers out of $N_{FFT}$ physical subcarriers, and configured to generate $N_{FFT}$ transmit symbols corresponding to the $N_{FFT}$ physical subcarriers;

an inverse fast fourier transform (IFFT) processor configured to perform an inverse fourier transform on the $N_{FFT}$ transmit symbols output by the subcarrier mapper; and a parallel to serial converter configured to convert an output of the IFFT processor to a serial output stream, wherein the $N_{FFT}$ available physical subcarriers comprise orthogonal subcarriers defined across a frequency band including a plurality of discontiguous available bandwidth segments, and wherein the N available physical subcarriers are distributed among the plurality of discontiguous available bandwidth segments, wherein the subcarrier mapper is further configured to assign at least one pilot signal to at least one of the plurality of logical subcarriers, wherein the IFFT processor is further configured to modulate each of the available physical subcarriers with data from a corresponding logical subcarrier, wherein the subcarrier mapper is further configured to set an input data signal corresponding to each of the plurality of unavailable physical subcarriers to zero, wherein the subcarrier mapper is further configured to define a plurality of clusters in the discontiguous bandwidth segments, each of the clusters comprising a plurality contiguous subcarriers, configured to define an adaptive modulation and coding (AMC) subchannel comprising a plurality of contiguous clusters extending over a plurality of contiguous symbols, configured to allocate a first plurality of subcarriers within the AMC subchannel as pilot subcarriers such that the pilot subcarriers are distributed uniforml across the AMC subchannel, and configured to allocate a second plurality of subcarriers within the AMC subchannel as data subcarriers, and wherein pilot subcarriers in an AMC channel are offset by two subcarriers in adjacent symbols.

2. The transmitter of claim 1, wherein the AMC subchannel comprises two clusters over three symbols.

3. The transmitter of claim 1, wherein the AMC subchannel comprises one cluster over six symbols.

4. The transmitter of claim 1, wherein the subcarrier mapper is configured to allocate the pilot subcarriers for an AMC subchannel at locations determined by the indices of logical subcarriers.

5. The transmitter of claim 1, wherein the pilot subcarriers for an AMC channel including nine subcarriers per cluster are determined according to the equation:

$$\text{pilot\_subs}(n, k) = 9n + 3m + 1 \text{ for } n = 0, 1, \ldots, \left\lceil \frac{N}{9} \right\rceil,$$

wherein:

n is an index number of a pilot subcarrier in a symbol;

k is an index of the symbol;

m is given by k mod 3; and

⌈X⌉ denotes the largest integer not greater than X.

6. The transmitter of claim 1, wherein the subcarrier mapper is further configured to assign a plurality of data symbols to data subcarriers in the AMC subchannel according to a scrambling sequence.

7. The transmitter of claim 6, wherein the scrambling sequence is defined by a Galois field and an offset.

8. The transmitter of claim 6, wherein the scrambling sequence is unique to a particular cell and/or sector of a wireless communications system.

9. The transmitter of claim 1, further comprising:

a plurality of spreaders configured to spread the communications signals using a plurality of corresponding spreading codes;

a combiner configured to combine the plurality of spread communications signals to form a combined communications signal; and a serial to parallel converter configured to convert the combined communications signal to parallel communications signals.

10. The transmitter of claim 9, wherein the combiner is further configured to combine the plurality of communications signals with a pilot signal.

11. The transmitter of claim 9, wherein the subcarrier mapper is further configured to assign the parallel communications signals to respective ones of a plurality (N) of logical subcarriers, and configured to map the plurality of logical subcarriers to corresponding ones of the plurality of available physical subcarriers.

12. The transmitter of claim 1, wherein the subcarrier mapper is further configured to assign at least one pilot signal to at least one of the plurality of logical subcarriers, and wherein the IFFT processor is further configured to modulate each of the available physical subcarriers with data from a corresponding logical subcarrier.

13. The transmitter of claim 12, wherein the subcarrier mapper is further configured to set an input data signal corresponding to each of a plurality ($N_{FFT}$-N) of unavailable physical subcarriers to zero, wherein the parallel communications signals and the at least one pilot signal comprise N information signals corresponding to the available physical subcarriers; and wherein the IFFT processor is further configured to perform an $N_{FFT}$-point inverse fourier transform of the N information signals corresponding to the available physical subcarriers and the $N_{FFT}$-N input data signals corresponding to each of the plurality of unavailable physical subcarriers.

14. The transmitter of claim 13, further comprising a parallel to serial converter configured to convert an output of the $N_{FFT}$-point inverse fourier transform to a serial data stream.

15. A receiver for a wireless communications system, comprising:

a serial to parallel converter configured to convert a received symbol stream to an $N_{FFT}$ symbol wide parallel received symbol stream;

a fast fourier transform (FFT) processor configured to perform an $N_{FFT}$-point fourier transform on the parallel received symbol stream and to generate received symbols corresponding to $N_{FFT}$ subcarriers; and a subchannel demapper configured to select N symbols of the received symbols corresponding to the $N_{FFT}$ subcarriers, wherein the N selected symbols correspond to N available physical subcarriers out of the $N_{FFT}$ subcarriers and configured to reconstruct a transmit data stream associated with the receiver from the N selected symbols, wherein the $N_{FFT}$ available physical subcarriers comprise orthogonal subcarriers defined across a frequency band including a plurality of discontiguous available bandwidth segments, and wherein the N available physical subcarriers are distributed among the plurality of discontiguous available bandwidth segments, wherein the subcarrier demapper is further configured to receive at least one pilot signal from at least one of the plurality of available physical subcarriers, wherein the subcarrier demapper is further configured to receive a plurality of clusters in the discontiguous bandwidth segments, each of the clusters comprising a plurality contiguous subcarriers, and configured to extract the at least one pilot signal from an adaptive modulation and coding (AMC) subchannel comprising a plurality of contiguous clusters extending over a plurality of contiguous symbols, and wherein the subcarrier demapper is configured to locate pilot subcarriers in an AMC channel including nine subcarriers per cluster according to the equation:

$$\text{pilot\_subs}(n, k) = 9n + 3m + 1$$

$$\text{for } n = 0, 1, \ldots, \left\lceil \frac{N}{9} \right\rceil,$$

wherein:
n is an index number of a pilot subcarrier in a symbol;
k is an index of the symbol;
m is given by k mod 3; and
⌈X⌉ denotes the largest integer not greater than X.

16. The receiver of claim 15, wherein the AMC subchannel comprises two clusters over three symbols.

17. The receiver of claim 15, wherein the AMC subchannel comprises one cluster over six symbols.

18. The receiver of claim 15, wherein the subcarrier demapper is further configured to extract a plurality of data symbols from data subcarriers in the AMC subchannel according to a scrambling sequence.

19. The receiver of claim 18, wherein the scrambling sequence is defined by a Galois field and an offset.

20. The receiver of claim 18, wherein the scrambling sequence is unique to a particular cell and/or sector of a wireless communications system.

21. The receiver of claim 15, further comprising:
a parallel to serial converter configured to convert the reconstructed transmit data stream to a parallel communications signal; and
a despreader configured to despread the parallel communications signals using a spreading code associated with the receiver.

22. A communications system, comprising:
a transmitter comprising:
a subcarrier mapper configured to receive a plurality of input symbols, configured to assign the plurality of input symbols to N logical subcarriers, configured to map the N logical subcarriers to N available physical subcarriers out of $N_{FFT}$ physical subcarriers wherein $N_{FFT}$>N and configured to generate $N_{FFT}$ transmit symbols corresponding to the $N_{FFT}$ physical subcarriers;
an inverse fast fourier transform (IFFT) processor configured to perform an inverse fourier transform on the $N_{FFT}$ transmit symbols output by the subcarrier mapper; and
a parallel to serial converter configured to convert an output of the IFFT processor to a serial output stream; and
a receiver comprising:
a serial to parallel converter configured to convert a received symbol stream to an $N_{FFT}$ symbol wide parallel received symbol stream;
a fast fourier transform (FFT) processor configured to perform an $N_{FFT}$-point fourier transform on the parallel received symbol stream and to generate received symbols corresponding to $N_{FFT}$ subcarriers; and
a subchannel demapper configured to select N symbols of the received symbols corresponding to the $N_{FFT}$ subcarriers, wherein the N selected symbols correspond to N available physical subcarriers out of the $N_{FFT}$ subcarriers, and configured to reconstruct a transmit data stream associated with the receiver from the N selected symbols, wherein the $N_{FFT}$ available physical subcarriers comprise orthogonal subcarriers defined across a frequency band including a plurality of discontiguous available bandwidth segments, and wherein the N available physical subcarriers are distributed among the plurality of discontiguous available bandwidth segments, wherein the subcarrier mapper is further configured to assign at least one pilot signal to at least one of the plurality of logical subcarriers, wherein the IFFT processor is further configured to modulate each of the available physical subcarriers with data from a corresponding logical subcarrier, wherein the subcarrier mapper is further configured to set an input data signal corresponding to each of the plurality of unavailable physical subcarriers to zero, wherein the subcarrier mapper is further configured to define a plurality of clusters in the discontiguous bandwidth segments, each of the clusters comprising a plurality contiguous subcarriers, configured to define an adaptive modulation and coding (AMC) subchannel comprising a plurality of contiguous clusters extending over a plurality of contiguous symbols, configured to allocate a first plurality of subcarriers within the AMC subchannel as pilot subcarriers, such that the pilot subcarriers are distributed uniformly across the AMC subchannel, and configured to allocate a second plurality of subcarriers within the AMC subchannel as data subcarriers, and wherein pilot subcarriers in an AMC channel are offset by two subcarriers in adjacent symbols.

23. The communications system of claim 22, wherein the AMC subchannel comprises two clusters over three symbols.

24. The communications system of claim 22, wherein the AMC subchannel comprises one cluster over six symbols.

25. The communications system of claim 22, wherein the subcarrier mapper is configured to allocate the pilot subcarriers for an AMC subchannel at locations determined by the indices of logical subcarriers.

26. The communications system of claim 22, wherein the pilot subcarriers for an AMC channel including nine subcarriers per cluster are determined according to the equation:

$$\text{pilot\_subs}(n, k) = 9n + 3m + 1$$

$$\text{for } n = 0, 1, \ldots, \left\lceil \frac{N}{9} \right\rceil,$$

wherein:
n is an index number of a pilot subcarrier in a symbol;
k is an index of the symbol;
m is given by k mod 3; and
⌈X⌉ denotes the largest integer not greater than X.

27. The communications system of claim 22, wherein the subcarrier mapper is further configured to assign a plurality of data symbols to data subcarriers in the AMC subchannel according to a scrambling sequence.

28. The communications system of claim 27, wherein the scrambling sequence is defined by a Galois field and an offset.

29. The transmitter of claim 1, wherein the N available physical subcarriers do not include guard subcarriers.

30. The receiver of claim 15, wherein the N available physical subcarriers do not include guard subcarriers.

31. The communications system of claim 22, wherein the N available physical subcarriers do not include guard subcarriers.

* * * * *

UNITED STATES PATENT AND TRADEMARK OFFICE
CERTIFICATE OF CORRECTION

PATENT NO.        : 8,494,457 B2
APPLICATION NO.   : 12/765946
DATED             : July 23, 2013
INVENTOR(S)       : Zheng It is certified that error appears in the above-identified patent and that said Letters Patent is hereby corrected as shown below:

In the Specification:

Column 7, Lines 38-39: Please correct "physical subcarriers.
The subcarrier"
to read as one continuous sentence -- physical subcarriers. The subcarrier --

Columns 15-16, Table 1: Please replace Table 1 with the following, making certain the first character in the column identified as "Exponential Represent." appears as -- α --:

Table 1. The GF(49) Field Elements Generated Using the Prime Polynomial in (x)

| Exponential Represent. | Polynomial Represent. | Hepta Represent | Decimal Represent | Exponential Represent. | Polynomial Represent. | Hepta Represent | Decimal Represent |
|---|---|---|---|---|---|---|---|
| $a^1$ | $x$ | 10 | 7 | $a^{25}$ | $6x$ | 60 | 42 |
| $a^2$ | $5x+4$ | 54 | 39 | $a^{26}$ | $2x+3$ | 23 | 17 |
| $a^3$ | $x+6$ | 16 | 13 | $a^{27}$ | $6x+1$ | 61 | 43 |
| $a^4$ | $4x+4$ | 44 | 32 | $a^{28}$ | $3x+3$ | 33 | 24 |
| $a^5$ | $3x+2$ | 32 | 23 | $a^{29}$ | $4x+5$ | 45 | 33 |
| $a^6$ | $3x+5$ | 35 | 26 | $a^{30}$ | $4x+2$ | 42 | 30 |
| $A^7$ | $6x+5$ | 65 | 47 | $a^{31}$ | $x+2$ | 12 | 9 |
| $a^8$ | 3 | 03 | 3 | $a^{32}$ | 4 | 04 | 4 |
| $a^9$ | $3x$ | 30 | 21 | $a^{33}$ | $4x$ | 40 | 28 |
| $a^{10}$ | $x+5$ | 15 | 12 | $a^{34}$ | $6x+2$ | 62 | 44 |
| $a^{11}$ | $3x+4$ | 34 | 25 | $a^{35}$ | $4x+3$ | 43 | 31 |
| $a^{12}$ | $2x+2$ | 22 | 16 | $a^{36}$ | $5x+5$ | 55 | 40 |
| $a^{13}$ | $2x+6$ | 26 | 20 | $a^{37}$ | $5x+1$ | 51 | 36 |
| $a^{14}$ | $2x+1$ | 21 | 15 | $a^{38}$ | $5x+6$ | 56 | 41 |

Signed and Sealed this
Third Day of March, 2015

Michelle K. Lee
*Deputy Director of the United States Patent and Trademark Office*

| | | | | | | | |
|---|---|---|---|---|---|---|---|
| $\alpha^{15}$ | $4x+1$ | 41 | 29 | $\alpha^{39}$ | $3x+6$ | 36 | 27 |
| $\alpha^{16}$ | 2 | 02 | 2 | $\alpha^{40}$ | 5 | 05 | 5 |
| $\alpha^{17}$ | $2x$ | 20 | 14 | $\alpha^{41}$ | $5x$ | 50 | 35 |
| $\alpha^{18}$ | $3x+1$ | 31 | 22 | $\alpha^{42}$ | $4x+6$ | 46 | 34 |
| $\alpha^{19}$ | $2x+5$ | 25 | 19 | $\alpha^{43}$ | $5x+2$ | 52 | 37 |
| $\alpha^{20}$ | $x+1$ | 11 | 8 | $\alpha^{44}$ | $6x+6$ | 66 | 48 |
| $\alpha^{21}$ | $6x+4$ | 64 | 46 | $\alpha^{45}$ | $x+3$ | 13 | 10 |
| $\alpha^{22}$ | $6x+3$ | 63 | 45 | $\alpha^{46}$ | $x+4$ | 14 | 11 |
| $\alpha^{23}$ | $5x+3$ | 53 | 38 | $\alpha^{47}$ | $2x+4$ | 24 | 18 |
| $\alpha^{24}$ | 6 | 06 | 6 | $\alpha^{48}$ | 1 | 01 | 1 |

Column 16, Equation (6), Lines 40-48: Please correct the equation below:

$$\begin{cases} Q_m(k) + \\ (\lceil \frac{n}{48} \rceil) \bmod 49 & \text{if } \begin{cases} Q_m(k) + \\ (\lceil \frac{n}{48} \rceil) \bmod 49 \end{cases} \bmod 49 \neq 0 \\ (\lceil \frac{n}{48} \rceil) \bmod 49 & \text{if } \begin{cases} Q_m(k) + \\ (\lceil \frac{n}{48} \rceil) \bmod 49 \end{cases} \bmod 49 = 0 \end{cases} \quad (6)$$

to read as:

$$\begin{cases} \left\{ Q_m(k) + \left( \left\lceil \frac{n}{48} \right\rceil \right) \bmod 49 \right\} \bmod 49 & \text{if } \left\{ Q_m(k) + \left( \left\lceil \frac{n}{48} \right\rceil \right) \bmod 49 \right\} \bmod 49 \neq 0 \\ \left( \left\lceil \frac{n}{48} \right\rceil \right) \bmod 49 & \text{if } \left\{ Q_m(k) + \left( \left\lceil \frac{n}{48} \right\rceil \right) \bmod 49 \right\} \bmod 49 = 0 \end{cases} \quad (6)$$

Column 18, Equation (7), Lines 4-12: Please correct the equation below:

$$y_i^k(t) = \sum_{n=0}^{N_{FFT}-1} b_i^k q_n^k e^{j2\pi(f_0 + n\Delta f)t} p(t - it) \quad (7)$$

$$= \sum_{n=0}^{N_{FFT}-1} s_i^k(n) e^{j2\pi(f_0 + n\Delta f)t} p(t - iT)$$

to read as:

CERTIFICATE OF CORRECTION (continued)
U.S. Pat. No. 8,494,457 B2

$$y_i^k(t) = \sum_{n=0}^{N_{FFT}-1} b_i^k q_n^k e^{j2\pi(f_0 + n\Delta f)t} p(t - iT)$$

$$= \sum_{n=0}^{N_{FFT}-1} s_i^k(n) e^{j2\pi(f_0 + n\Delta f)t} p(t - iT) \quad (7)$$

In the Claims:

Column 21, Claim 1, Line 35: Please correct "distributed uniforml across"
to read -- distributed uniformly across --

Column 24, Claim 22, Lines 28-29: Please correct "comprising a plurality contiguous"
to read -- comprising a plurality of contiguous --